Dec. 1, 1953 G. W. CARLSON 2,661,154
UNIT FOR TRANSLATING PUNCHED CARD DATA
Filed June 8, 1951 6 Sheets-Sheet 1

Inventor
George W. Carlson
By
Christy, Parmelee and Strickland.
Attorneys

Dec. 1, 1953  G. W. CARLSON  2,661,154
UNIT FOR TRANSLATING PUNCHED CARD DATA
Filed June 8, 1951  6 Sheets-Sheet 2
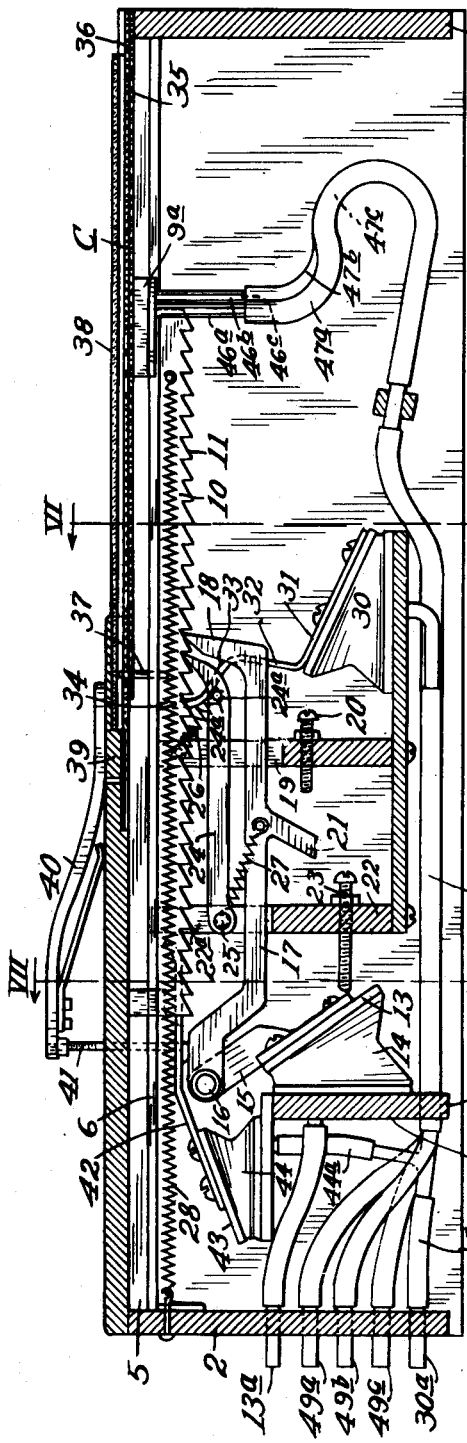
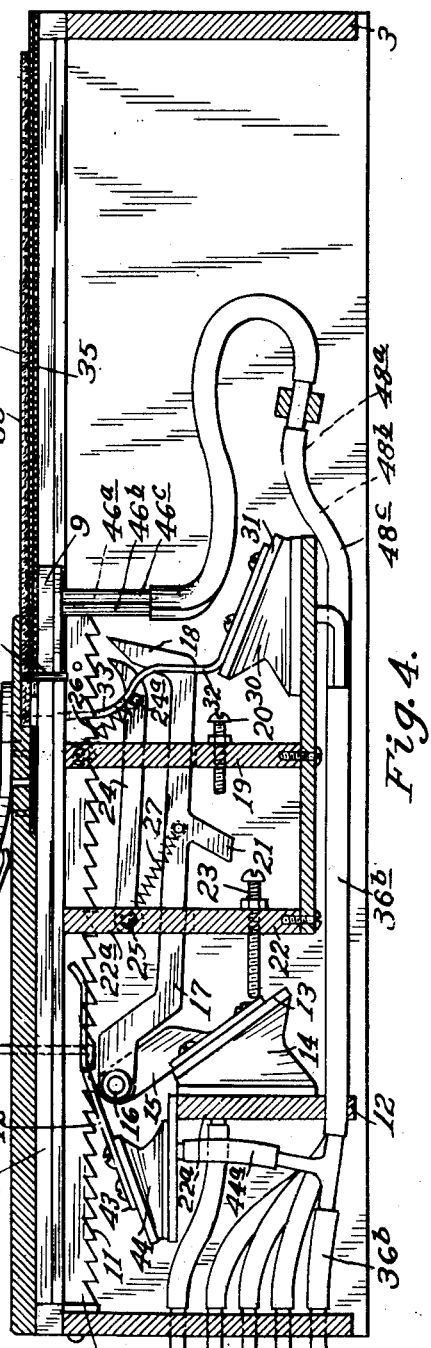
Inventor
George W. Carlson
By
Christy, Parmelee and Strickland
Attorneys Dec. 1, 1953     G. W. CARLSON     2,661,154
UNIT FOR TRANSLATING PUNCHED CARD DATA
Filed June 8, 1951     6 Sheets-Sheet 3
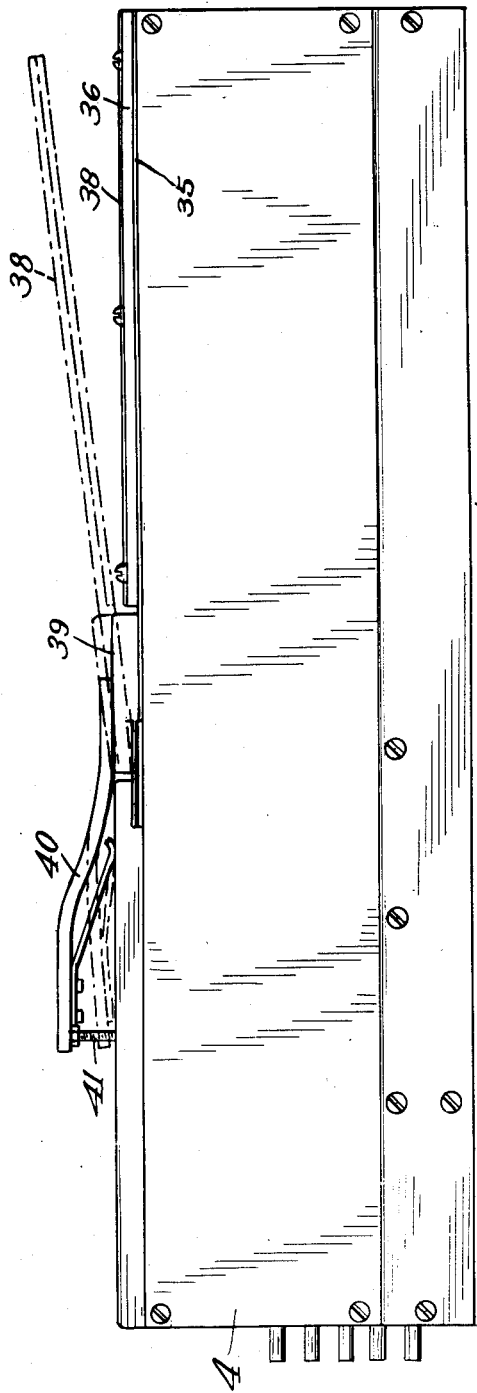
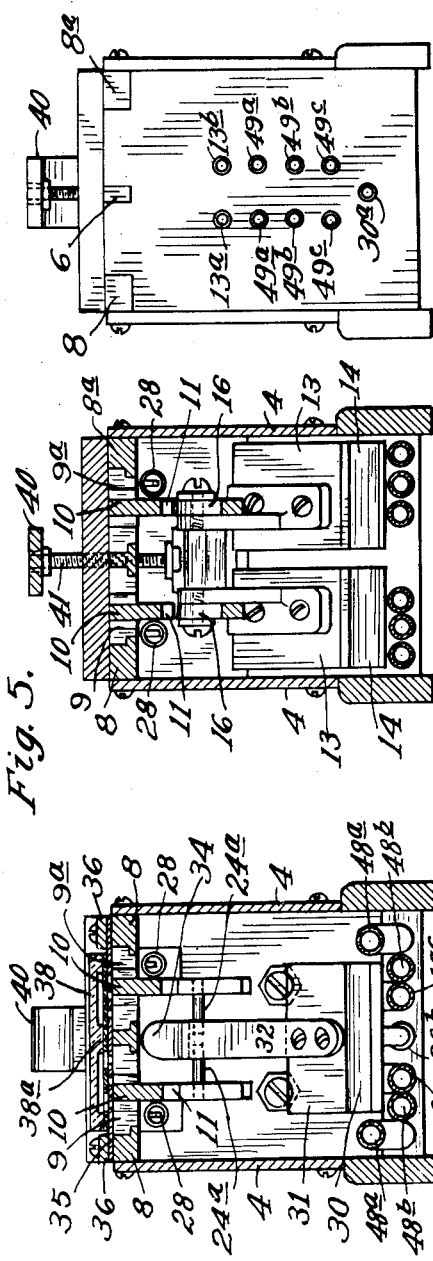
Inventor
George W. Carlson
By Christy Parmelee and Strickland
Attorneys

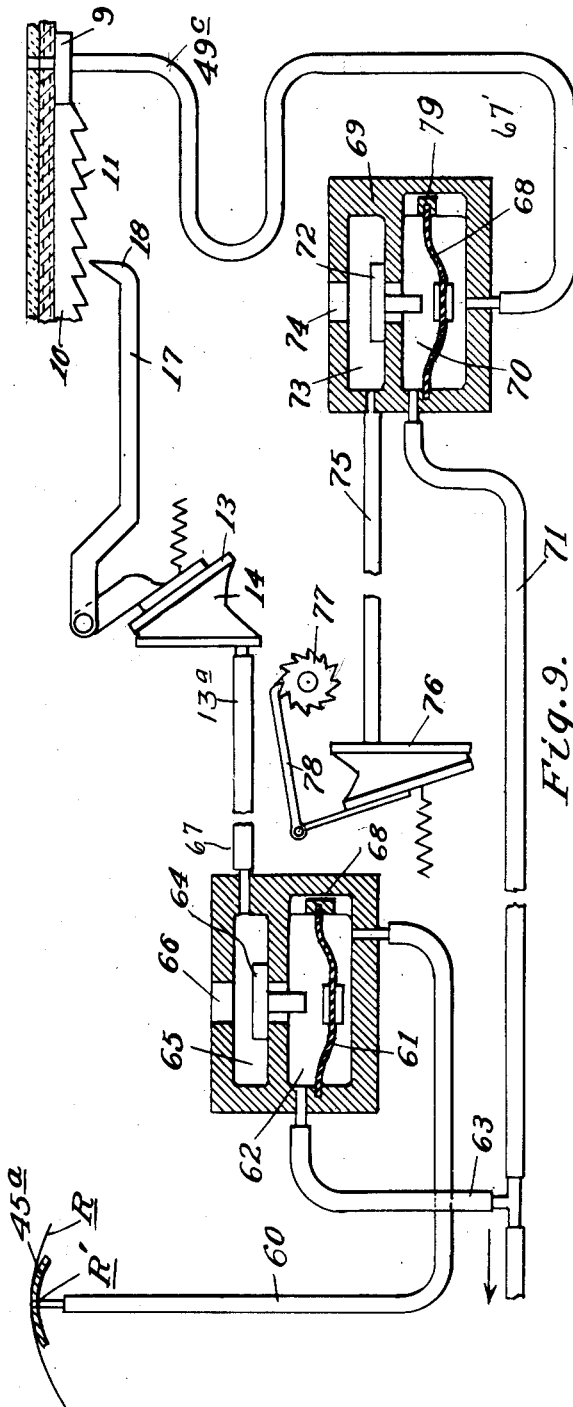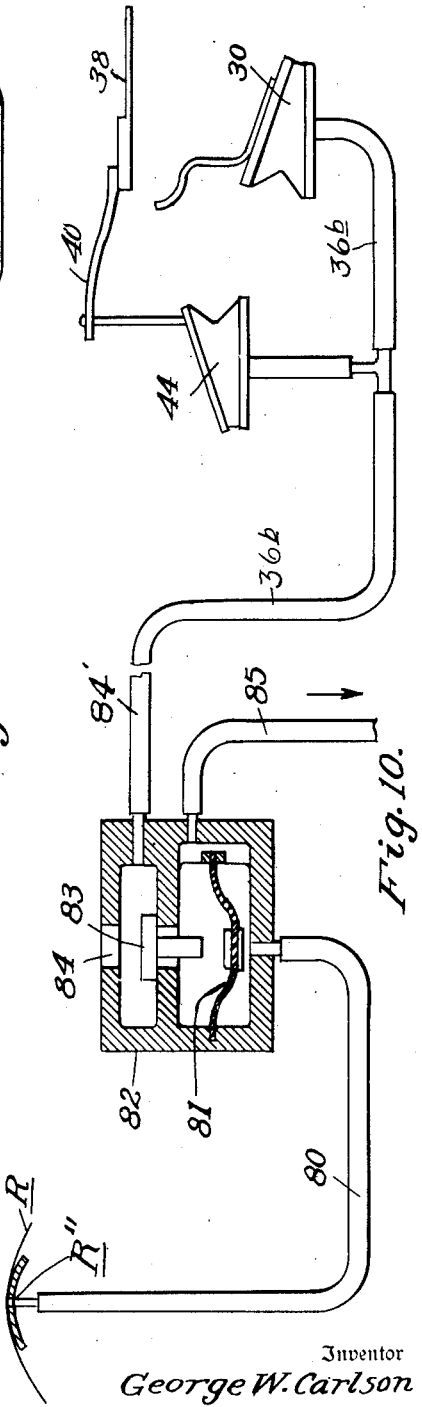

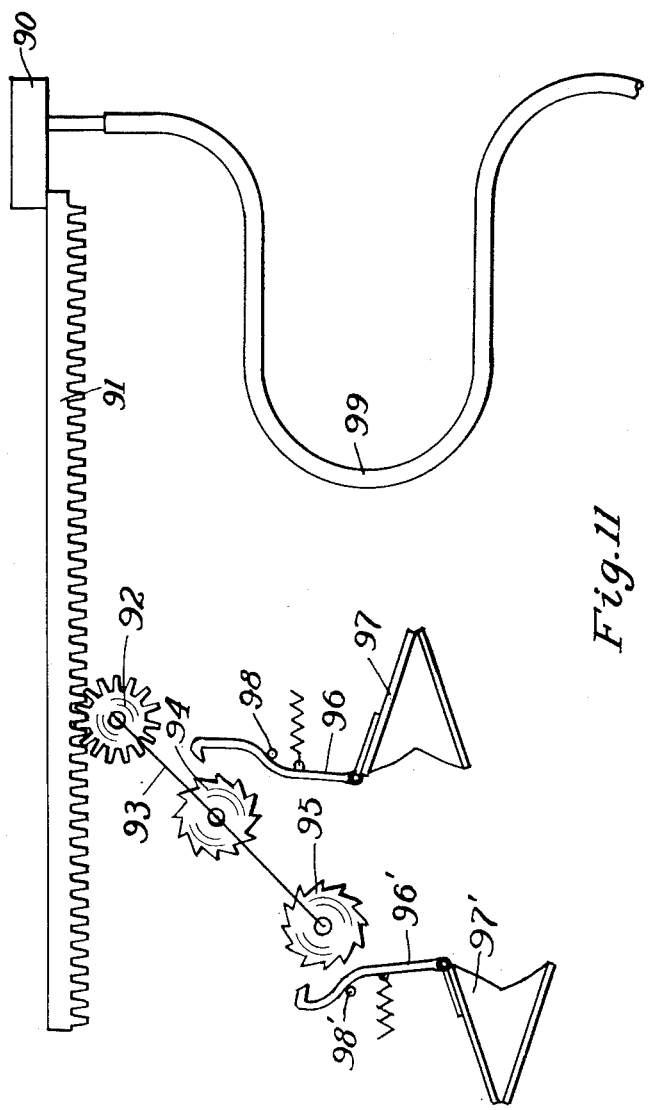

Dec. 1, 1953 G. W. CARLSON 2,661,154
UNIT FOR TRANSLATING PUNCHED CARD DATA
Filed June 8, 1951 6 Sheets-Sheet 6

Inventor
George W. Carlson
Christy, Parmelee and Strickland
Attorneys

Patented Dec. 1, 1953

2,661,154

UNITED STATES PATENT OFFICE 2,661,154

UNIT FOR TRANSLATING PUNCHED CARD DATA

George W. Carlson, Mountain Home, N. C., assignor to Robotyper Corporation, Hendersonville, N. C., a corporation of Michigan Application June 8, 1951, Serial No. 230,661

29 Claims. (Cl. 235—61.11)

1

This invention relates to an apparatus adapted to receive perforated or punched cards and effect sequence of operations according to a prearranged plan dictated by the position of openings in the card.

Many types of business or manufacturing operations utilize punched cards to tabulate information or schedule operations and various machines are operated or information is translated into useful form by means of such cards or a succession of them. For example, typewriting machines may be operated by a record roll to write individually typed letters. By use of the present invention, a punched card may be used to automatically fill in the names and addresses for individually typed letters. Various other data signified by the location of punched holes in cards, or sequences of operations, may be translated or effected by such cards.

In the accompanying drawings to be hereinafter referred to, my invention is embodied in a machine designed particularly for use with a record controlled typewriter having two record spools, and the punched card enables a letter to be typed using portions only of each record spool. The combination of this invention with a record controlled typewriter is more fully described in a copending application, and is here mentioned only to show a concrete use for the device to be particularly described.

My invention has for its object to provide a pneumatic system for "scanning" or interpreting punched cards and translating them either into writing or sequence of actions. A further object of my invention is to provide a pneumatic unit for this purpose which is compact, of unique construction, positive in its operations, and adaptable to a wide variety of uses. A further object is to provide a unit of this nature which enables cards of a convenient size to be used, and in which separate areas of the card may be separately scanned.

These and other objects and advantages will appear from the following description of one unit embodying my invention in conjunction with the accompanying drawings, in which:

Fig. 3 is a longitudinal vertical section in the plane of line III—III of Fig. 2;

Fig. 4 is a similar section in the plane of line IV—IV of Fig. 2, showing the two pawls for suction slide in the released position;

2

Figure 12:
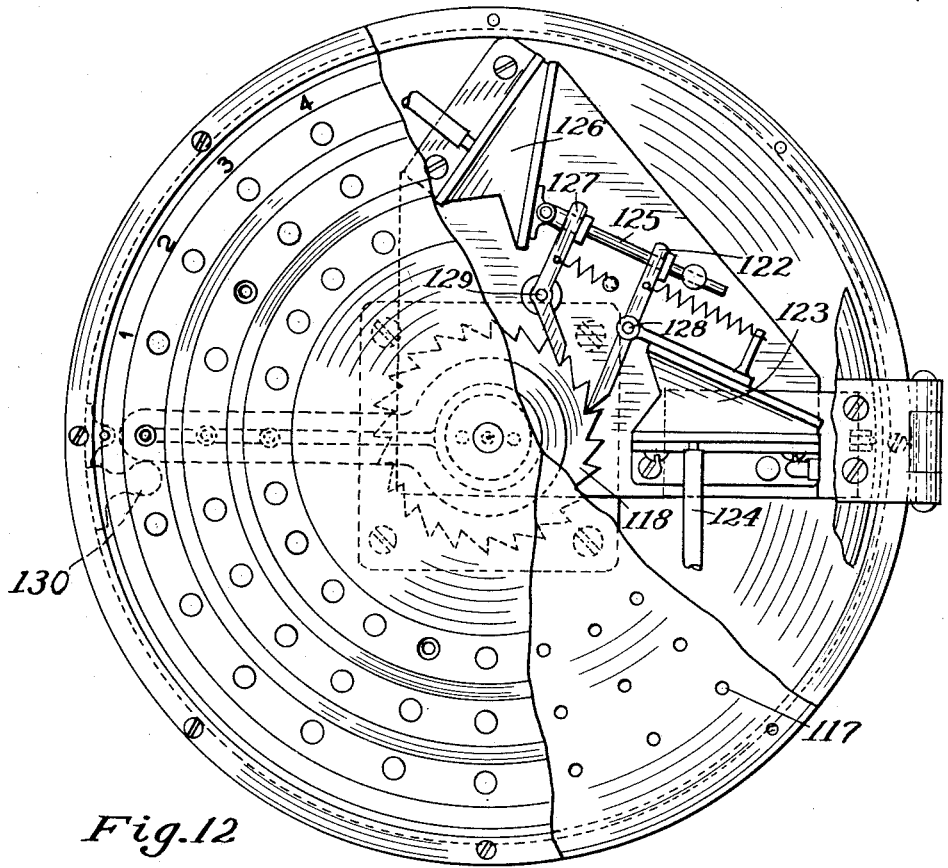
Figure 13:
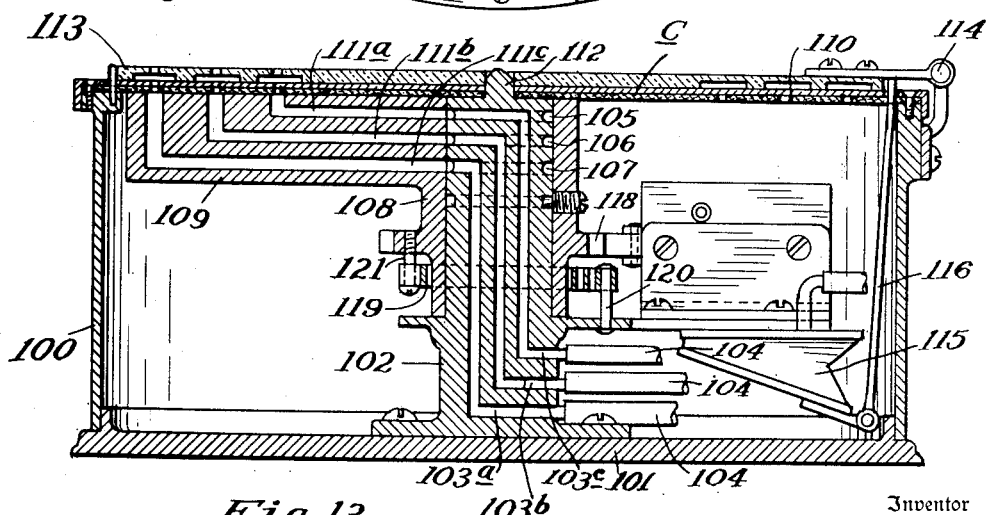

Fig. 5 is a side elevation of the unit showing in dotted lines the card holding cover elevated to a position which it assumes after one card has been used and it is to be replaced by another;

Fig. 6 is a transverse vertical section in the plane of line VI—VI of Fig. 3;

Fig. 7 is a transverse vertical section in the plane of line VII—VII of Fig. 3;

Fig. 8 is an end view of the unit showing the several nipples for establishing the vacuum circuits to the unit;

Fig. 9 is a schematic vacuum circuit for a simple operation of the suction slide to advance it, the diagram being arbitrary with no relation to any particular type of work being done;

Fig. 10 is a similar diagram for the cover lifting and pawl releasing pneumatics;

Fig. 11 is a schematic view of the movable slide plate, but with provision for moving it positively by pneumatics in each direction, conventional parts of the apparatus being omitted;

Fig. 12 is a top plan view, with certain parts broken away, of a circular arrangement, where the slide moves in an arc which may be 360°; and Fig. 13 is a transverse vertical section through the apparatus shown in Fig. 12.

Referring to the drawings, the unit comprises a generally rectangular box having an end wall 2 at one end and a second end wall 3 at the other end. The box has removable side plates 4 held in place by screws, and which merely serve to protect the mechanism inside the box from damage or exposure. The top of the box is provided with two parallel side rails 5 extending along opposite sides of the box, and in addition in the particular unit shown, there is also a central rail 6 extending throughout the length of the cover parallel with the side rails. There must be two or more side rails in order to provide one or more longitudinal extending channels in the top of the structure. In the particular construction shown with three longitudinally-extending rails, there are two channels or slideways in the top of the structure designated 8 and 8a (Fig. 5). The top rails, including the two at the side and the middle one, are flanged as shown in the drawings to retain slide plates or movable suction plates designated 9 and 9a. It will be understood that if there were only a single slideway, there would be but one of these slide plates, but the construction shown has two slideways side by side, and hence there are two slide plates each independently movable. The slide plates have a range of movement through about half the length of the unit. They are movable from a retracted position about midway of the length of the box to a fully extended position adjacent the right-hand end wall 3.

Each slide plate has attached thereto a rack 10, the rack 10 for each slide plate being the same. This rack has teeth 11 which are ratchet-shaped teeth, so as to enable the slide plates or suction plates 9 and 9a to be moved step by step through a ratchet mechanism to be hereinafter described. Since both plates are operated in the same way and have identical operating mechanisms, only one of these mechanisms will be particularly described.

Extending transversely across the interior of the box is a fixed supporting plate 12, Fig. 3, which supports two pneumatics in side-by-side relation (see Fig. 7), these pneumatics being bellows-like devices of a type commonly used in pneumatic vacuum systems. The transverse plate 12 provides a fixed wall for both pneumatics, while there is a movable leaf 13 for each of them, the leather bellow being designated 14. One of these pneumatics operates slide 9, and one slide 9a. Where only a single slide is used, there would be only one. The movable leaf 13 of the pneumatic has an upwardly-extending projection or arm 15 rigidly secured thereto and projecting above the top thereof. The upper end of this arm is pivotally joined at 16 to a link 17 which extends horizontally toward the end wall 3. It has a vertical offset thereon and at its free end it has a pawl 18 for engagement with the ratchet teeth 11 on the rack 10. The arrangement is such that when the leaf 13 of the pneumatic is drawn in by suction toward the plate 12, the upwardly-extending arm 15 will swing in an arc toward the end 3, moving the pawl 18 which is engaged with a tooth in the rack 10 so as to advance the rack a distance equal to one tooth on the ratchet.

The forward end of the link 17 passes through a slot in a transverse partition 19. The length of the structure of the link under the action of the pneumatic in a forward direction, i. e., in a direction to advance the rack bar, can be very accurately limited by means of a set screw 20 in the transverse partition, arranged in the path of travel of an abutment 21 which is inclined downwardly from the link 17, the inclination being downwardly and rearwardly with respect to the forward stroke of the link. Thus when the abutment 21 hits the set screw 20, a slight upward component of motion is created by the inclined surface pressing against the end of the screw. This upward component of pressure merely assures that the pawl will be firmly held in engagement with the tooth at the time the forward motion of the link is arrested, and assures in each operation that the rack will travel the full stroke of the link.

Between the transverse partition 19 and the transverse plate 12 there is another transverse plate 22 having an extension 22a that extends upwardly at the center of the box. This plate 22 has a set screw 23 that may be adjusted to contact the movable leaf 13 of the pneumatic on its opening stroke so as to provide a limit of travel for the link 17 and pawl 18 in its reverse stroke.

There is a second pawl 24, which is a holding pawl, and which is pivotally supported at 25 on the extension 22a. This holding pawl is urged upwardly by a spring 26 connected to a transverse pin 24a mounted on the pawl 24 near its free end, and which extends inwardly toward the longitudinal center of the box. The other end of the spring 26 is anchored on the transverse plate 19.

There is also a spring 27 attached to the link 17, and which has its other end anchored to the pivot 25 for holding pawl 24. This spring is put under tension when the link moves forward on its operating stroke, and operates to yieldably retract the link from the forward limit of its movement. It also exerts a slight upward component of movement, keeping the tip of the pawl in operative engagement with the ratchet teeth of the rack 10.

There is a tension spring attached to the rack 10 near its forward end, i. e., adjacent the slide plate, and the opposite end of this spring is anchored to the end wall 2, the spring being therefore a relatively long spring. Its function is to retract the rack and slide the left when the two pawls 18 and 24 are simultaneously pulled down out of engagement with the rack teeth.

Supported in the structure near the bottom thereof is a pneumatic of bellows form 30, having a movable upper leaf 31. Attached to the upper leaf 31 is an upwardly-projecting extension 32 with a rearwardly-extending arm 33 thereon, and the top of this arm in turn has an upwardly-turned lug 34 that normally rests against the middle top rail 6. This member 32—33—34 thus extends between the two holding pawls 24 for the two racks (Fig. 6), and the arm 33 extends over the pins 24a and both of the pawls 24. The arrangement is such that when the leaf 31 of the pneumatic is pulled downwardly by a suction impulse, the extension 32 will move downwardly and the arm 33 will press down on the pins 24a of both holding pawls and disengage both holding pawls from their respective racks. In their downward movement, the holding pawls 24 will contact the operating pawls 18 and disengage them from the racks also. When both pawls of both slide plates are thus simultaneously disengaged, their respective tension springs 28 will simultaneously move both slides back to their starting position or retracted position.

In the arrangement just described, one pneumatic thus serves to release both slides to permit them to return to starting position, but if desired, the same mechanism could be duplicated to permit separate release of the respective slides which normally, however, would appear to have little practical advantage.

The operation therefore is that upon a suction impulse being transmitted to the pneumatic 13—14, the operating pawl 18 will advance the rack 10 one tooth, sliding the slide plate along its trackway or slideway. Each vacuum impulse advances the slide plate one step. Where there are two slide plates as shown, each is operated independently of the other in the advancing direction by its own pneumatic. At the proper time in the operation the release pneumatic 30 is given a vacuum impulse to withdraw all of the pawls from both racks and allow the slides to move simultaneously to the retracted position.

There is a suction line leading from one of the pneumatics 13—14 to a nipple 13a on the back plate 2. There is a similar tube leading to a nipple 13b on the back plate alongside 13a (Fig. 8). At the bottom of the back plate 2 there is a nipple 30a leading through a line 30b to the pneumatic 30, through which a vacuum impulse can be transmitted to the pneumatic 30.

Over the top of the box extending along that part of the range of movement of the slide plate 9 and 9a there is a perforated suction face. In the particular arrangement shown, the suction face has two longitudinal columns of holes with three longitudinal rows of holes in each column. These holes are lined up transversely across the suction face in rows.

The suction face is designated 35, and along each side edge of the suction face is a guide strip 36 to permit a card to be inserted between the guides over the suction face. A stop pin 37 positions the card longitudinally over the suction face. The card, designated generally as C, may thus be laid between the two guides 36 and pushed toward the left until its end engages the pin 37. The card C has punch markings thereon that corresponds to the holes in the suction face. That is, there are two columns of markings at each side of a central division, each column having three longitudinal rows of markings, and all of the markings are arranged in transverse rows.

Designated markings may be punched to provide openings through the card. Thus when the card is put into position over the suction face, the punched holes in the card will register accurately with the holes in the suction face.

For the purpose of holding the cards in position, and also preventing foreign objects from getting into the suction face, there is a cover plate 38 over the suction face, and this cover plate is preferably formed of clear plastic. It is flat on top, but on the under side are three longitudinal ribs 38a, one in the middle, and one along each edge, so that when the cover plate is down against the card, there will be air channels open to atmosphere between each pair of ribs 38a. The purpose of this is to allow atmospheric air to be admitted through the holes in the card and through the suction face into the slide plates as hereinafter described for the operation of the mechanism.

The cover plate 38 is secured at its inner end to a hinged metal leaf on the top of the unit. This leaf 39 has a rearwardly-extending arm 40, and there is an adjustable connection or link 41 extending from the arm 40 to an extension 42 secured to the movable upper plate 43 of a pneumatic 44. There is a suction line 44a leading from the bottom of the pneumatic 44 that enters the tube or line 30b that extends from the nipple 30a to the pneumatic 30. With this arrangement, every time the pneumatic 30 is operated to let the slide plates move back to their starting position, the pneumatic 44 is also operated to lift the cover plate 38 to enable one card to be removed and another inserted.

The slides 9 and 9a are of like construction. Each has a flat top face that has a close working fit against the perforated suction face 35. In the particular embodiment shown, each slide has a transverse row of three holes therein, the spacing of which corresponds to the spacing of the rows of holes in each column of the suction face. In other words, where the suction face has three rows of holes to be scanned, there are three holes in the transverse row on the slide plate 9 or 9a. That is to say that if there were only one slide plate instead of two, and the suction face had six rows of holes in it as shown, then this single slide plate could have six or any other desired number of holes in a transverse row thereacross.

The arrangement is such that as the slide plate is moved step by step toward the right, the row of holes in the top face thereof will pass in succession under the row of holes in the overlying portion of the suction face. If there is a perforation in a card registering with a hole in the suction face, air can pass through the card, through the suction face, and into the hole in the slide when the slide comes into register with the position of such a punched hole in the card.

Figure 1:
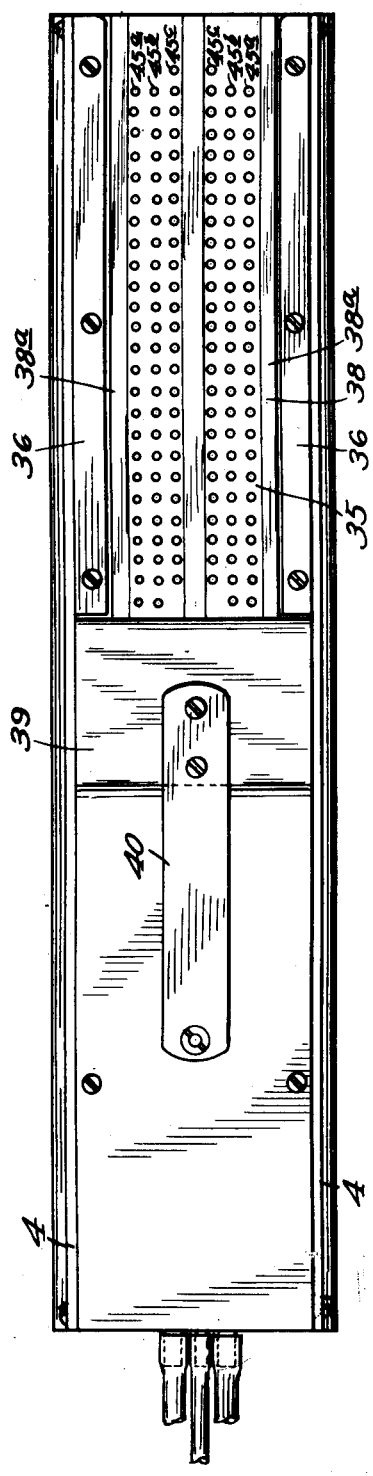
Fig. 1 is a top plan view of the unit without any card in place, showing what I term to be the suction or control face of the unit.
Figure 2:
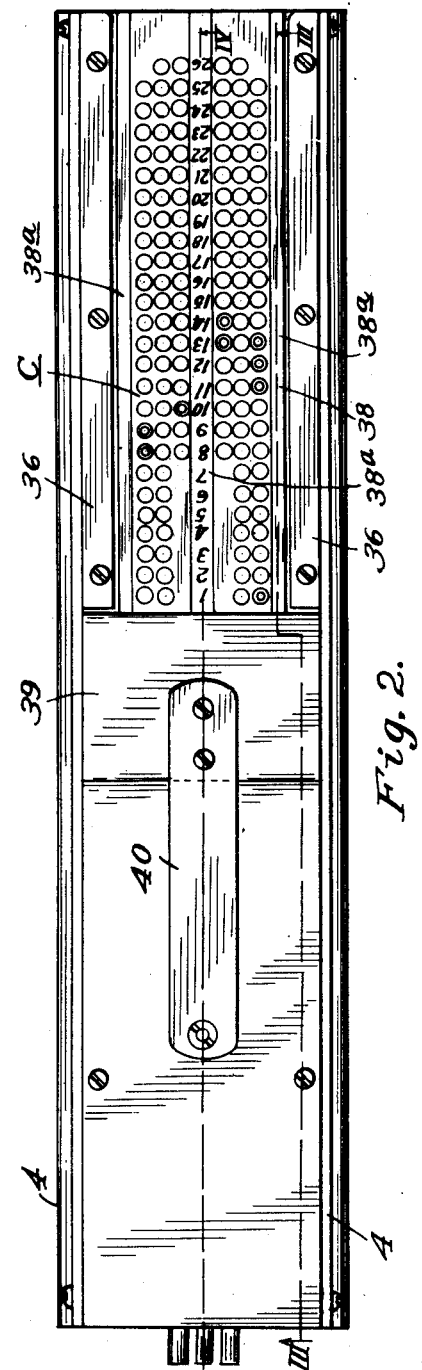
Fig. 2 is a similar view with punched card in place.

The holes in the movable slide, which may be compared to the openings in the tracker bar of a more conventional type of pneumatic action, are designated 45a, 45b and 45c, Fig. 1, and there is a nipple extending from the under face of the slide plate leading to each hole, these nipples being designated 46a, 46b and 46c, Fig. 3, respectively. To each nipple there is connected a flexible tube designated 47a, 47b and 47c, the flexible tubes permitting the slide plates to move. The flexible tubes 47a, 47b and 47c are in turn connected by tubes 48a, 48b and 48c with a bank of nipples 49a, 49b and 49c, and since in the unit shown there are two slide plates, there are two banks of nipples 49a, 49b and 49c on the end plate 2.

By reason of these tubes, air impulses which are admitted through the holes in the cards can be transmitted to some device which is to be controlled by such an air impulse.

The punched card may be utilized to control each of two record rolls on an automatic typewriter so that portions of one record may be used, followed by selected portions of another record, and operation can alternate from one to the other as required. Instead of being used in this manner, however, the present invention can be used to operate various counters or other recording devices, or to operate other selector mechanisms, or to operate coding machines or de-coding devices, or even effect the operation of billing machines, or to effect the selective operation of machine tools.

My invention provides a simple mechanism for converting the holes punched in cards, or a succession of cards, into readable form, or in a sequence of actions. The device is simple and positive, and cards can be quickly inserted and removed.

In the accompanying drawings, I have shown for purposes of illustration, one schematic diagram of a pneumatic circuit utilizing the present invention, but this is purely arbitrary and illustrative.

For example, in Fig. 9, R is a record sheet, and R' is a tracker bar which are mounted in another pneumatically operated machine. A tube 60 leads from the bar to the under side of a pneumatic "pouch" or flexible diaphragm in a unit 61. There is a chamber 62 above the diaphragm leading to a suction line 63 that goes to a vacuum pump (not shown), pneumatic circuits of this kind being well known in the art.

Above the diaphragm in unit 61 is a valve 64 in a chamber 65 that is normally open to atmosphere through port 66. A tube 67 leads from chamber 65 to the tube 13a connected with the bellows 14. There is a bleed opening 68' between the chamber 62 and the chamber under the pouch diaphragm unit 61 so that normally there is a vacuum in line 66. When an impulse of air is admitted through the record into tube 60, the atmospheric pressure momentarily pushes the diaphragm 61 up, lifting valve 64 to close port 66 and connect bellows 14 through tube 67, chamber 65, chamber 62, and tube 63 to the vacuum pump. Bellows 14 is thus collapsed by suction, and pawl 17 is thrust to the right to move the slide 9 one tooth to the right.

Tube 49c, for purpose of illustration, may be connected with a tube 67 leading to the under side of a diaphragm 68 in a pouch unit 69 in all respects similar to pouch unit 61. It has a suction chamber 70 over the diaphragm leading through tube 71 to suction line 63. It has a valve 72, an upper valve chamber 73, and a port 74 that opens to atmosphere. A tube 75 leads from the upper valve chamber 73 to a pneumatic 76. This pneumatic may operate a valve or perform any other desired function, as for example turning a ratchet wheel 77 of a counting mechanism, this being effected through the reciprocation of pawl 78. Thus every time an impulse of air is admitted through the passage 49c, the ratchet wheel of the counting mechanism would be turned one unit. The pneumatic system just described of course works the same as the system involving the pouch 61 and the pneumatic 14. When the impulse of air enters the tube 49c, it restores atmospheric pressure to the under side of the diaphragm 68, whereas there is suction on the upper face of this diaphragm. Consequently the diaphragm is bowed upwardly, lifting the valve 72, closing the port 74, and opening the line 75 to the suction line 71. When the opening to tube 49c is thereafter closed, the atmospheric air bleeds out through the bleed passage at 79 to the suction line.

It will be understood that the pouch units 61, 69 and 76 and counter 77 are located in a separate pneumatically operated machine. When an air impulse is given in tube 49c by having an opening in the slide 9 register with an opening in the central card C, the impulse will be conveyed to the associated machine. The tube 75 may be connected with other parts to be operated, as well as the impulse counter.

In Fig. 10 there is a diagram similar to Fig. 9, showing schematically the operation of the pneumatics 30 and 44 from a record roll in an associated machine to bring the slides 9 and 9a to starting position. When the record R has a perforation that moves over the tracker bar opening R'', an impulse of air is admitted to tube 80, which in turn operates the pneumatic pouch 81 in a valve unit 82 located in an associated machine, similar to the units previously described. This raises a valve 83 to close a port 84, and at the same time connect through a tube 84 with tube 30b leading to bellows 44 and 30. With valve 83 closed, a vacuum operates the bellows through a line 85 going to a suction pump (not shown). Thus when the record R reaches a position to uncover the tracker bar opening R'', the pneumatics 30 and 44 will be simultaneously operated. It will be recalled that the pneumatic 30 trips the pawls 18 and 24 so that the slide 9 or 9a, as the case may be, can be pulled back to its starting position by its spring 34, while the pneumatic 44 raises the cover 38 to permit the removal of one card C and the insertion of another one.

In the present preferred embodiment of my invention, the slide which "scans" or moves into register with the holes in the punched cards moves in one direction under air impulses. In some instances it may be desirable to move the slide pneumatically in both directions. This is schematically illustrated in Fig. 11, where the slide 90 corresponds to the slide 9 of the previous figures. Instead of having a ratchet bar attached thereto, there is a rack 91 with conventional teeth. A pinion 92 on shaft 93 engages the rack. There are opposite ratchet wheels 94 and 95 on the shaft. Ratchet wheel 94 has associated therewith an operating pawl 96 connected with a pneumatic 97. The pawl is so shaped that when the pneumatic 97 is operated to collapse, the pawl will first be cammed over, as by a pin 98, and then engaged with the ratchet to turn the shaft. A similar pawl 96', pneumatic 97', and pin 98' are provided for operating the reversed ratchet wheel 95. Thus by operation of these pneumatics 94 and 96, the slide may be moved selectively a predetermined distance in either direction.

I have shown in Fig. 11 only the elements of the mechanism without the card holder, and it will be understood that the slide, as previously described, will have several openings across its face and several flexible tubes, as tube 89 attached thereto, so that a selected impulse may be transmitted in a given position to a predetermined pneumatic circuit. Neither have I shown in this schematic view such blocking circuits as may desirably be used in the associated record roll mechanism by which holes in an overlying card being scanned may be scanned only when the slide is moving in a predetermined direction so that conflicting impulses will not be directed by the slide as it moves in one direction or the other under the overlying card. Circuits of this type are well known in the art and are used in the rewind operation of music rolls for example, to avoid the reverse playing of the music roll when it is going in the rewind direction.

In Figs. 12 and 13 I have shown a movable multiple hole slide on a radial arm that moves in a circular path. I have shown, for purposes of illustration, an apparatus in which the arm moves in one direction by pneumatic action, and in a reverse direction by spring action, but it might more simply revolve in one direction. The housing 100 has a base plate 101 on which is supported a central post 102. This post is provided with a plurality of passageways therein, three such passageways here being shown and being designated 103a, 103b and 103c. The passageways at their lower ends lead into nipples into which flexible tubes designated 104 are connected.

The respective passageways terminate at their upper ends in annular grooves 105a, 106a, and 107a.

A collar 108 has a working fit on the post, and it is provided with a radial extension 109, the top surface of which bears against a card supporting platform 110. The radial arm 109 has a series of passageways therein designated 111a, 111b and 111c, that communicate with the annular grooves 105a, 106a and 107a respectively. The top of the post terminates in a pin 112 for centering a card on the top of the platform 110. The card is here designated with the letter C, and is removable. There is a cover plate 113 preferably of transparent plastic, mounted on a hinge 114. The cover plate may be raised manually, but I have shown a pneumatic 115 which serves to accomplish this purpose by means of a link 116, the operation of the pneumatic being similar to the operation of the pneumatic 42 in the construction first described.

The under side of the cover is provided with concentric grooves, as shown, and these grooves open to atmosphere. The grooves are so positioned that the upwardly-turned terminals of the several passageways 111a, 111b and 111c are in register therewith.

The card-supporting member or platform 110 is provided with radial rows of holes, these holes being designated 117, and the arm 109 is adapted to be moved step by step into register with these holes. If the overlying card is also provided with a registering hole, atmospheric air can be admitted, but if the overlying card does not have a registering perforation, no atmospheric impulse can pass through the platform.

For moving the arm 109 in a step-by-step motion, the hub or sleeve 108 is provided with a ratchet wheel 118. There may also be provided a torsion spring 119 around the spring, having one end anchored at 120 to the post, and having the other end attached at 121 to the sleeve. The arrangement is such that when the ratchet moves the sleeve and the hub in a clockwise direction, the spring is put under tension.

For operating the ratchet there is provided an operating pawl 122 which is actuated by a pneumatic 123, this pneumatic corresponding in function to the pneumatic 14 of the form shown in Figs. 1 to 11 inclusive. It may be operated by impulses from the tracker bar of another machine or otherwise, there being a tube 124 for establishing a pneumatic circuit to the pneumatic 123. The outer end of the pawl 122 is bifurcated. A rod 125 passes through the bifurcation, and is attached to a pneumatic 126. There is a holding pawl 127 through which the rod 125 also passes. The pawl 122 has a pivotal support on the pneumatic 123 at 128, and the holding pawl 127 has a pivotal support at 129. When the pneumatic 126 is operated, both pawls 122 and 127 are moved on their respective pivots to clear the ratchet wheel 118 and allow the torsion spring to operate to return the sleeve to its starting position. A fixed abutment 130 determines the starting position.

As previously indicated, the torsion spring 119 may be omitted, in which case the pneumatic 126 for operating the holding pawl is unnecessary, and the arm would simply continue in a circular path through a complete circle and return in this way to its starting position. Of course with such an arrangement the abutment 130 would not be provided.

The operation of the device is essentially the same as that first described. The lid or cover 113 is lifted to permit the removal of one card, and the insertion of another. As the arm 109 is caused to travel around under the card-supporting platform, air impulses are admitted to the several passageways according to the pattern appearing on the perforated card, and these impulses are transmitted through the passageways to the respective tubes 104 to selectively effect the desired operation of some other piece of equipment.

The pneumatics 115 and 126, like the pneumatic 123, are controlled from an external record.

In both forms of the device as herein described, there is a card-supporting member having a plurality of rows of holes therein. There is a slide member with a plurality of ports therein, movable under the card support, and a mechanism is provided for advancing this slide member through a predetermined range of movement. In conventional pneumatic equipment a perforated record roll moves over a stationary tracker bar, whereas with the present invention the slide corresponding somewhat in function to a tracker bar, moves over or scans a perforated record card. Normally the card is accessory equipment to some record roll machines to perform some auxiliary or complementary function whereby the utility of a record roll machine can be substantially enhanced. The device herein described may be variously designed to receive large or small cards, or to have many holes in the slide, or a few. The invention can be especially adapted for the conversion of coded information on cards into a specific sequence of operations or into written form.

In both forms of the invention, the card-supporting platform is preferably of a slightly flexible plastic material so as to be held against the surface of the slide by suction, thus eliminating the possibility of leakage and compensating for wear. Also in the two specific embodiments herein described, the slide is disposed under the card, but it will be apparent that the invention adapts itself to the arrangement where the slide is above the card.

While I have shown and described specific embodiments of my invention, it will be understood that this is by way of illustration and that the various parts may be changed and modified to better adapt the construction to convenient manufacture within the contemplation of my invention.

As previously explained, the particular pneumatic circuits are more or less schematic, and the device may be used in various operations where punched cards can be advantageously employed in business machines, automatic letter writing, accounting, tabulating, or other operations.

I claim:

1. A pneumatic unit for use in connection with punched cards for effecting a sequence of operations according to the openings in the cards, said unit comprising a fixed card-supporting table having at least one row of holes therein, means for holding a punched card in prearranged position over said table whereby a hole in the card may register with a hole in the table, a slide member bearing against the under side of the table and movable therealong under the said row of holes, said slide having a hole therein to register successively with the holes in said row, a flexible tube attached to said slide and connected with a pneumatic operating mechanism for conveying an impulse of air admitted through the hole in said slide to said pneumatic responsive mechanism, means for moving the slide progressively under the row of holes, and means for returning the slide to its starting position.

2. A unit as defined in claim 1 wherein said slide is provided with a rack having ratchet teeth thereon and the means for moving the slide progressively includes a pawl engaging said rack and means for operating said pawl.

3. The unit as defined in claim 2 in which said teeth are spaced to advance the slide a distance equal to the distance apart of the holes in the table with one air impulse.

4. A unit as defined in claim 3 wherein said slide is provided with a rack bar attached thereto and having ratchet teeth therein, a reciprocable pawl engaging said rack for moving the slide from said starting position toward the opposite limit of its travel, a pneumatic for reciprocating said pawl, a second pawl engaging said rack for holding said slide against free movement, the means for returning the slide to its starting position comprising a spring, and another pneumatic for simultaneously disengaging both of said pawls from said rack to render said spring effective to return the slide to its starting position.

5. A pneumatic unit for use in connection with punched cards for effecting a sequence of operations according to the openings punched in the cards, said unit comprising a supporting frame having a slide member mounted therein for movement therealong, means for advancing the slide member from an initial starting position in a sequence of steps toward an opposite limit of travel, means for returning the slide to its starting position, a perforated card-supporting table against which the top face of the slide has a working fit, means for retaining a punched card in predetermined position on said table, said slide having an opening therein at the top face of the slide, and a flexible tubing attached to the said slide and communicating with said opening, whereby an impulse of air entering said opening through a hole in a card may be conveyed to a pneumatically-responsive mechanism.

6. The unit as defined in claim 5 in which said card covers all of the perforations in the table and is arranged to impart an air impulse to the slide member only when an opening in the card registers with an opening in the table and slide.

7. The unit as defined in claim 1 in which the pneumatic operating mechanism includes a vacuum suction system to place suction through the holes in the slide and the table for supporting the card flexible and movable in response to a vacuum suction to make a close fit with the top of the slide.

8. The unit as defined in claim 1 in which a transparent card cover is hingedly mounted over said table to hold the card on the table.

9. The unit as defined in claim 1 in which a perforated record roll for controlling the operation of a pneumatic operated machine is movable over a tracker bar having openings for registration with openings in the roll, a flexible tube connection between said bar and a pneumatic operating mechanism for the slide, said mechanism being responsive to an air impulse given by registration of an opening in the roll with an opening in the bar to release the slide for return to its starting position.

10. The unit as defined in claim 9 in which a transparent cover is mounted to swing over the table with an air operated bellows to move the cover up and away from the table, and a tube connection between the bellows and the tracker bar to operate the bellows when an air impulse is imparted in the tube through an opening in the record roll.

11. The unit as defined in claim 9 in which a transparent cover is hingedly mounted to swing over the table, with operating means connected thereto, which is operated in response to air impulse to move the cover away from the table when the slide is returned to starting position.

12. The unit as defined in claim 9 in which the slide is connected with a rack having ratchet teeth and a pawl is arranged to engage the ratchet to advance the slide, said pawl being operated intermittently for moving the slide.

13. The unit as defined in claim 12 in which the ratchet and pawl positively hold the slide in advanced position with means responsive to an air impulse to release the pawl from the rack, and a spring for returning the slide to its starting position.

14. A unit as defined in claim 1 in which a perforated record roll for controlling the operation of a pneumatic machine is movable over a tracker bar having openings for registration with openings in the roll, a flexible tube connection between said bar and a pneumatic operating mechanism for the slide, said mechanism being responsive to an air impulse by registration of an opening in the roll with an opening in the bar to advance the slide one step for each impulse.

15. The unit as defined in claim 1 in which a table is provided with a plurality of longitudinally-arranged rows of holes with holes in the rows in transverse alignment, a slide having holes therein arranged to register with the holes in each of the rows of holes in the table, and a flexible tube connected with each hole in the slide and also connected with a pneumatic operating mechanism to convey an impulse of air which is admitted simultaneously through holes in the slide card and table to said pneumatic operated mechanism.

16. The unit as defined in claim 1 in which the pneumatic operating mechanism includes bellows, and a vacuum pump is connected with the bellows whereby the vacuum will operate the bellows when the air impulse is given to the mechanism.

17. The unit as defined in claim 1 in which the table is provided with a plurality of sets of a plurality of rows of holes in each set, a separate slide mounted to move under the table adjacent each set of rows of holes, a hole in each slide arranged to register under holes of each row of each set, a flexible tube connected with each hole in each slide, each tube being connected with a pneumatic operating mechanism to convey an air impulse admitted through openings in the card which register with openings in the slides, to said pneumatic mechanism.

18. The unit as defined in claim 17 in which each slide is connected with a rack having teeth thereon and a bellows operated pawl has connections with the rack teeth to advance the slide with intermittent steps in accordance with air impulses imparted to the bellows.

19. The unit as defined in claim 18 in which each slide is connected with a rack having teeth thereon, a pinion engaging the teeth, a bellows for operating each pinion, and means to intermittently rotate the pinion to move the slides when impulses are imparted to the bellows.

20. The unit as defined in claim 19 in which a ratchet and pawl device is connected with each pinion to rotate the pinion in either direction to intermittently move the slide.

21. The unit as defined in claim 20 in which a pawl and ratchet is used to move the pinion for each slide in forward and reverse directions, the pawls being operated by bellows impulses in accordance with air impulses imparted to the bellows by registration of holes in the card with holes in the slides.

22. A pneumatic unit for use in connection with punched cards for effecting a sequence of operations according to openings in the cards, said unit comprising a card supporting table having a plurality of sets of a plurality of rows of holes, means for holding a punched card in pre-arranged position over said sets whereby a hole in the card may register with a hole in the table, a separate slide mounted to move under the table holes of each set, a hole in each slide arranged to register with holes of each row of each set, a flexible tube connected between each hole in each slide and a pneumatic operating mechanism to convey an air impulse admitted through openings in the card which register with openings in the slide to said pneumatic mechanism, a perforated roll and tracker bar for operation in conjunction with each slide, said roll and tracker bar having openings corresponding to the rows of holes in each slide, a flexible tube connection between the corresponding openings in the tracker bar and a pneumatic operating mechanism for the slides, said mechanism being responsive to an air impulse by registration of an opening in the roll with an opening in the bar to advance the slide one step for each impulse.

23. The unit as defined in claim 22 in which an impulse caused by the registration of an opening in the roll with an opening in the bar acts to release the slides for return to their starting position.

24. A pneumatic unit for use in connection with punched cards for effecting a sequence of operations according to the openings in the cards, said unit comprising a card supporting table having a plurality of sets of a plurality of rows of holes in each set, means for holding a punched card in pre-arranged position over said table whereby a hole in the card may register with a hole in the table, a separate slide mounted to move under the table holes of each set, a hole in each slide arranged to register with holes in each row of each set, a flexible tube connected between each hole in each slide and a pneumatic operating mechanism to convey an air impulse admitted therein through openings in the card which register with openings in the slide to said pneumatic mechanism, a perforated roll and tracker bar for operation in conjunction with each slide, said rolls and tracker bars having openings corresponding to the rows of holes in each corresponding slide, a flexible tube connection between the corresponding openings in the tracker bar, and a pneumatic operating mechanism for the slides, said mechanism being responsive to air impulses by registration of an opening in the roll with an opening in the bar, and an air impulse produced by registration of a hole in the card with a hole in the table and slide acting to shift the control of operation of one roll and its slide to another roll and its corresponding slide.

25. The unit as defined in claim 1 in which the holes in the table and card are arranged in circular rows, the diameter of the rows of holes in the table and card being the same and the spacing of the holes in the card and table being the same.

26. The unit defined in claim 25 in which the slide is fixed on an arm which is revolved about a center which is the center of a row of holes.

27. The unit defined in claim 26 in which a ratchet wheel is mounted on the slide arm and a pair of pawls are pneumatically operated in accordance with air impulses generated by the registration of holes in the card with holes in the table and card and slide to intermittently advance the slide.

28. The unit defined in claim 27 in which a pneumatic operating mechanism is given an air impulse to release the pawls from the ratchet when an opening in the card registers with an opening in the table and slide and allow a spring to rotate the slide back to starting position.

29. The unit defined in claim 1 in which the table is circular and of a flexible composition yieldable in response to a vacuum suction.

GEORGE W. CARLSON.

References Cited in the file of this patent
UNITED STATES PATENTS

| Number | Name | Date |
| --- | --- | --- |
| 1,350,850 | Trew | Aug. 24, 1920 |
| 2,165,925 | Goodrum et al. | July 11, 1939 |